United States Patent [19]
List et al.

[11] 3,903,849
[45] Sept. 9, 1975

[54] INTERNAL COMBUSTION ENGINE WITH INTERNAL MIXTURE FORMATION

[75] Inventors: Hans List; Karl Kirchweger, both of Graz, Austria

[73] Assignee: Hans List, Graz, Austria

[22] Filed: May 10, 1973

[21] Appl. No.: 358,951

[30] Foreign Application Priority Data
May 10, 1972 Austria .............................. 4111/72
June 20, 1972 Austria .............................. 5307/72
Sept. 15, 1972 Austria .............................. 7965/72
Sept. 15, 1972 Austria .............................. 7963/72

[52] U.S. Cl. ........ 123/30 C; 123/75 B; 123/188 M; 123/31
[51] Int. Cl. ............................................... F02f 1/42
[58] Field of Search ......... 123/188 M, 30 C, 193 H, 123/75 B

[56] References Cited
UNITED STATES PATENTS
| | | | |
|---|---|---|---|
| 2,837,067 | 6/1968 | Meurer | 123/180 R X |
| 3,411,490 | 11/1968 | Akana | 123/188 M X |
| 3,557,766 | 1/1971 | Stark | 123/188 M X |
| 3,769,948 | 11/1973 | Feichtinger et al. | 123/188 M X |

FOREIGN PATENTS OR APPLICATIONS
| | | | |
|---|---|---|---|
| 2,017,877 | 11/1970 | Germany | 123/188 M X |
| 983,059 | 2/1965 | United Kingdom | 123/188 M |
| 844,352 | 8/1960 | United Kingdom | 123/188 M |
| 837,085 | 6/1960 | United Kingdom | 123/188 M |

*Primary Examiner*—Charles J. Myhre
*Assistant Examiner*—W. Rutledge
*Attorney, Agent, or Firm*—Watson, Cole, Grindle & Watson

[57] ABSTRACT

An internal combustion engine with internal mixture formation, particularly a diesel engine, with two intake valves for each cylinder, through which the air for combustion is directed into the cylinder in a flow rotating about the cylinder axis, and with means for the formation of a branch air current at least at one of the intake valves whose direction of flow in the cylinder is opposed to the sense of rotation of the air for combustion entering the cylinder through the remaining intake valve cross-sections, so that turbulence is produced by the collision of the air currents flowing in opposite directions of rotation in the cylinder.

3 Claims, 27 Drawing Figures

PATENTED SEP 9 1975　　　　　3,903,849

SHEET 1

INTERNAL COMBUSTION ENGINE WITH INTERNAL MIXTURE FORMATION

The invention relates to an internal combustion engine with internal mixture formation, particularly a diesel engine comprising two intake valves for each cylinder, through which the combustion air is directed into the cylinder in a flow rotating about the cylinder axis.

In engines with internal mixture formation, the combustion air is required to rotate in the cylinder for the mixture formation in many cases, particularly with small cylinder diameters and high-speed rotation. Moreover, it is necessary for certain purposes, for example, in order to obtain a low $NO_x$ content of the exhaust gases, to expedite the combustion process. For that purpose, speedy mixture formation is required. Experience has shown that the mixture formation, and consequently also the combustion process, can be expedited by producing vehement turbulence of the combustion air rotating in the cylinder.

The combustion air can be made to rotate in the cylinder in a manner known per se either by means of helical inlet ports surrounding the valves, so-called rotary ducts, or by means of inlet ducts extending in oblique relation to the valve and in tangential relation to the cylinder. With cylinder heads comprising two intake valves for each cylinder it is occasionally possible, depending on the design used, to combine either two rotary ducts or one rotary and one inclined duct or a set of two inclined ducts in such a manner that different effects are produced with regard to the amount of inflowing air and the intensity of the rotational force thus produced in the cylinder, said effects depending in addition to the combination of inlet port types used also upon the pattern and cross-sections of individual inlet ports.

As regards the turbulence of the combustion air necessary to expedite the mixture formation it is advisable to achieve its full efficiency inside the cylinder. However, there are certain problems attaching the achievement of this aim insofar as turbulence is a process whose intensity is liable to diminish rapidly, the kinetic energy being consumed in the process and transformed into heat.

It is the purpose of the present invention to take such action in connection with an internal combustion engine of the type hereabove described as will ensure the production of a highly turbulent rotational flow of the cylinder charge with the possibility of altering the degree of turbulence and the desired air rotation so as to suite any given requirements. According to the invention, this problem is solved by producing a partial air current at least at one of the intake valves in such a manner that the direction of this current in the cylinder is in opposition to the sense of rotation of the combustion air entering the cylinder through the remaining intake valve cross-sections.

As a result of these measures which can be carried out by anyone skilled in the art by means of a number of different provisions, flow conditions are produced under which the desired turbulence is produced in the cylinder proper by the collision between the branch air currents rotating about the cylinder axis in opposite directions. Since turbulence is produced only just before the combustion process starts, its beneficial influence upon improved and expedited mixture formation is thereby fully exerted.

Although the rotation of the cylinder charge is somewhat reduced by the collision between the two partial air currents, yet a highly turbulent rotational flow in the direction of the stronger branch air current is produced, the extent of the rotation and turbulence of the resulting flow being controllable by appropriately dimensioning the branch air currents so as to best suite the design features of any given engine type.

As pointed out above, the purpose of the invention can be achieved by a number of different structural means. According to a preferred embodiment of the invention the air current introduced into intake valve(s) through the associated inlet port is split up into branch air currents flowing in oppposite rotational directions in relation to the cylinder axis by means of inserts in an area of the inlet port situated in the vicinity of the valve. This arrangement is particularly advantageous since it imposes few limitations regarding the design and shape of the inlet ports to the designer, so that the remaining structural aspects resulting from the particular design of multi-valve internal combustion engines, especially in view of the limited space available, can be taken fully into account. For example, where the inserts in the inlet port are designed as ribs, the branch air currents flowing in opposite directions can be most conveniently controlled in such a manner that the desired rotational force and the required degree of turbulence are produced in the cylinder. Another possibility of regulating these flow conditions resides in the use of inserts in one only or in both inlet ports. In each of these cases it is not necessary for that branch air current which is supposed to flow in opposition to the main air current rotating in the cylinder, in the required direction of rotation to emerge as a whole from the valve clearance already in this direction, but it is possible for parts of the weaker air current to flow through the valve clearance in such a direction that they are reflected by the adjacent cylinder wall into a direction opposed to the intended air rotation.

According to another embodiment of the invention inserts provided in the two intake valves are about the same distance from the cylinder axis and in the same relative position in relation to the cylinder axis. By this means the combustion air entering through the two intake valves is moved essentially in two concentric rings flowing in the cylinder in opposite directions of rotation, the main air currents from both valves uniting to form the outer ring rotating in the main rotational direction, whereas the inner ring combines the opposite branch air currents from the two valves. Although a partial mixture of the two currents already occurs during the inflowing stage, the collision of the two air currents which is responsible for the formation of the intended vehement turbulence of the cylinder charge is delayed in part towards the end of the compression, as in that stage the charge portions rotating in the two annular areas are shifted into the combustion chamber located in the piston, where the intended collision between the air layers flowing in opposite directions eventually occurs. Consequently, mixture between these portions of the charge occurs only just before combustion, so that turbulence is preserved in almost full force until such time when the fuel is injected.

As different from the embodiments of the invention hereabove described, flow conditions according to the invention are also produced by providing inlet ports in front of the intake valves extending in relation to the cylinder axis in directions producing essentially the opposite sense of rotation, a stronger branch air current being preferably conducted through one of the intake valves and a weaker branch air current through the other intake valve. Here too, the desired effect, namely the superposition of the intended rotational flow in the cylinder by vehement turbulence, is produced by the collision of the air currents emerging from the two intake valves in opposite directions.

In the latter instance, considerable space can be saved if according to a further feature of the invention, the inlet ports of the two intake valves are designed as inclined ducts. Thus full advantage can be taken of the known benefits to be derived from inclined ducts, namely their low overall height and low resistance to flow, according to the invention.

It is, however, also possible according to another embodiment of the invention, to design at least one of the inlet ports as a helical duct with a direction of exit which is oppposed to the direction of rotation of the air current conducted through the other intake valve. Here too, the degree of turbulence and of the resulting rotation of the cylinder load can be varied by appropriately determining the cross-sections of the helical duct and of the inlet port leading to the other intake valve as required.

According to another embodiment of the invention, a very space-saving and simple design of the inlet port system can be obtained by designing in a manner known per se one of the inlet ports as an inclined duct and the other as a helical duct, the intake valves being offset by about 90° to each other in relation to the cylinder axis, the intake valve associated with the inclined duct being — as viewed in the direction of the rotational force — located in a plane including the cylinder axis in front of the intake valve connected to the helical duct, said plane coinciding with a plane in normal relation to the longitudinal axis of the engine or being offset in relation to said normal plane by up to 45° in the direction of the rotational flow, the two inlet ports extending substantially in tangential relation to a cylindrical surface in concentric relation to the cylinder axis and including the valve axes and in a direction producing the same sense of rotation in relation to the cylinder axis.

In a known type of cylinder head of a four-valve internal combustion engine one intake valve is connected to an inclined duct and the other to a helical duct, the two inlet ducts leading from the upper cylinder head wall downwards extending, as viewed from above the cylinder head, essentially along a straight line and almost parallel to each other, only the inclined duct having a direction corresponding to the intended sense of rotation of the air in the cylinder. The section of the other inlet port sloping off spiral-like towards the valve produces an almost complete winding, so that the air current conveyed through this duct flows into the cylinder substantially also in the direction of the intended rotational flow via the valve clearance. This arrangement of the inlet port produces essentially only a reinforced rotation of the cylinder charge which according to recent technological findings is not alone responsible for the mixture formation and consequently for a desirable progress of the combustion process. Moreover, the shape of the helical duct is responsible for comparatively high resistances to flow in same. In addition, another drawback of the conventional inlet port arrangement resides in the fact that the inlet ports located one beside the other require a great deal of continuous space, with no space left for the passage of cylinder head screws, push-rods and the like. This greatly reduces the freedom of the designer for the construction of the cylinder head. Cylinder head screws have to be arranged at greater distances from each other, which is not convenient for considerations of solidity and in view of the necessity to seal the cylinder head off against the cylinder block.

On the other hand, the last-mentioned embodiment of the invention as applied to an internal combustion engine offers improved flow conditions and several structural advantages. As a matter of fact, the arrangement of the inclined duct and of the helical duct as different from conventional design patterns produces the intended turbulence of the combustion air superimposing the rotation of the cylinder charge. This effect is produced by the fact that in a certain peripheral area of the intake valve connected to the helical duct velocity vectors of the air flow exist which produce during their impact on the inner wall of the cylinder certain coponents in opposition to the direction of the main rotational flow in the cylinder. These flow components which according to conventional criteria viewing only at the production of a rotational flow are considered objectionable, impinge upon the substantially stronger air current emerging from the inclined duct and are deflected by the last-mentioned air current in the direction of the rotational main flow. This produces the desired turbulence so that advantage is conveniently taken of the aforesaid, otherwise objectionable flow components.

From a structural viewpoint, an essential advantage resides in the fact that during the arrangement of the two inlet ports the remaining structural aspects of the engine design can also be taken into consideration and that it is quite possible to use the space available between the two ducts for the arrangement of bolt bearings, push-rod passages or the like, without having to put up with reductions of the inlet port cross-sections or other compromise solutions.

According to another embodiment of the invention as applied to internal combustion engines featuring intake valves emerging from the same cylinder head sidewall, as viewed from above the cylinder head, the inclined duct passes from the cylinder head side-wall arch-fashion into the portion which is tangential in relation to the cylinder surface including the valve axes and the helical duct emerging from the cylinder head sidewall extends approximately in perpendicular relation to same, its inner wall facing the cylinder center extending as an arch interconnecting the valve guide bearings of the two intake valves, the convex side of which faces the cylinder center and adjoins the section of this inlet port which is wound in the shape of a spiral around the valve guide bearing, and the wall of the inclined duct sloping off towards the valve seat and located close to the cylinder head bottom, terminates above the valve seat as a cutting edge known per se. This arrangement permits a most space-savng design of the inlet ports in the area close to the valve and also provides relatively short ducts of a shape tending to improve flow conditions.

According to another embodiment of the invention, flow conditions are improved particularly by having the two inlet ports emerge in a manner known per se from a receiving chamber recessed in the cylinder head and extending alongside the suction-end cylinder head sidewall. By this means particularly short ducts of convenient flow conditions are obtained, while avoiding the bend at the beginning of the inclined duct which existed in the embodiment of the invention herebefore described.

On the other hand, when the basic idea of the present invention is applied to internal combustion engines with inlet ports emerging from the upper boundary surface of the cylinder head, according to another feature of the invention, as viewed from above the cylinder head, the two inlet ports extend essentially along a straight line, the inclined duct extending along an arch which is convex on the side of the cylinder head bottom and terminating above the valve seat as a cutting edge known per se, and the helical duct being converted, as from the upper cylinder head surface with an arched section which is convex towards the cylinder head bottom and an adjoining, inversely curved section, into the spiral-shaped duct portion. This design too, makes for relatively short and low-loss inlet ducts and permits the full utilization of the space available for the accommodation of the ducts.

According to a further embodiment of the invention it is also possible for an inlet port to emerge from a side-wall and the other inlet port from the upper boundary-wall of the cylinder head.

In order to substantially increase the intended turbulence of the cylinder load by simple means, according to another feature of the invention, the inlet ports and the intake valves are arranged, at least approximately, symmetrically in relation to a plane including the cylinder axis.

This design of the internal combustion engine is based upon the knowledge that the air movements effective in the direction of the cylinder axis are retarded considerably during the compression stage, so that in addition to the rotation about the cylinder axis, turbulence about parallel axes is mainly responsible for a favorable influence upon the speed of the mixture formation and of the combustion.

As a result of the last-mentioned arrangement of the inlet ports and intake valves, the formation of this kind of turbulence is enhanced to the maximum, since branch currents of an identical but opposed rotational flow around the cylinder axis are made to collide when turbulence in the cylinder rises to its peak force, whereas the resulting rotational force diminishes to zero. It is, however, possible, by a certain deviation from the strictly symmetrical arrangement, to obtain also systems of high turbulence and having a relatively low resulting rotational force in the sense of the branch current presenting the stronger rotational force.

The approximately symmetrical arrangement of the inlet ports and intake valves is particularly suitable for internal combustion engines featuring a convenient distribution of fuel among the combustion chamber by a great number of nozzle bores of the injection-nozzle generally located in the central portion of the combustion chamber.

According to another embodiment of the invention it may be advantageous to design the two inlet ports as symmetric inclined ducts. The particular advantage of this design resides in comparatively low space requirements of the inclined ducts, resulting chiefly in a reduction of the overall height of the cylinder head. Moreover, inclined ducts are distinguished by a shape facilitating the flow and avoiding losses.

If in addition, according to another feature of the invention, the two inlet ports extend at least in the area close to the valves in opposite directions, the collision of the branch air currents entering the cylinder through the two inlet ports occurs predominantly in the area between these two valves, so that vehement turbulence is produced particularly in this area.

Moreover, it is, however, also possible to shift the zone of maximum turbulence in the central area of the cylinder, if according to the invention the two inlet ports are at least approximately directed towards the cylinder axis. Such an arrangement offers, amongst others, also the advantage that with in-line internal combustion engines where all of the intake valves are located on the same side of the engine, the adjoining inlet ducts of two adjacent cylinders can be readily and space-savingly connected to a common inlet conduit.

In such cases where for other structural considerations, such as for example, the arrangement of the injection nozzle, it appears advisable to produce the turbulence in the cylinder area opposite the intake valves, it is possible, according to a further embodiment of the invention, to have the inlet ports which in a manner known per se branch off a common inlet conduit, extend in a diverging direction and approximately in tangential relation to a cylinder surface and in concentric relation to the cylinder axis and including the valve axes. This design too, distinguishes itself by low space requirements for the inlet port system, so that if necessary, additional space is available for the accommodation of larger cooling-water chambers, for the passage of push-rods, etc.

In principle, it is, however, also possible, according to another embodiment of the invention, to design the two inlet ports as helical ducts of symmetrical shape. Since in helical ducts the air passes into the cylinder through a much larger circumferential area of the valve clearance as compared with inclined ducts, minor branch currents will collide in the area of the plane of symmetry in many places, so that turbulence is produced practically over the whole diameter area of the cylinder.

According to a further feature of the invention the two inlet ports can be made to extend in opposite directions. Such an arrangement of the helical ducts can offer fundamental structural advantages for single-cylinder internal combustion engines, for example.

According to the present invention, it is, however, also possible to connect the two inlet ports to a common inlet conduit. In that case, similarly space-saving conditions prevail with hilical ducts as obtain where inclined ducts are connected in pairs to an inlet conduit.

According to another embodiment of the invention, the spiral-shaped section of each of the two inlet ports which slopes off towards the valve seat is subdivided by means of a tongue or the like directed towards the valve axis and extending as far as close to the valve seat. The effect of these tongues or similar inserts in the spiral-shaped section of the inlet port is a split-up of the combustion air flowing to the valves into at least two branch currents flowing in the cylinder in opposite rotational senses. The shape and arrangement of this tongue provides a very useful means for influencing the direction and force of these branch currents, and consequently, for distributing the turbulence zones in the cylinder as required.

According to another embodiment of the invention as applied to internal combustion engines, the intake valves are arranged side by side in a manner known per se, the helical duct and the inlet port leading to the second intake valve extending in directions converging to each other.

Since in such an inlet system collision of the predominant portion of the air entering through the two inlet ports in opposite direction occurs directly after its emergence from the valve clearance in the area between the two valves, the turbulence produced in this zone is particularly vehement. Since the air admitted through the helical duct emerges through a much larger peripheral area of the associated intake valve than is the case with the other intake valve, flow components prevail at the intake valve associated with the spiral duct whose sense of rotation is in relation to the cylinder axis opposed to the sense of rotation of these flow components who together with the flow components of the adjacent intake valve produce the above-mentioned turbulence. These flow components rotating in opposite directions produce a resulting rotation of the cylinder charge superimposed upon the turbulent flow conditions.

According to a further embodiment of the invention as applied to an internal combustion engines comprising a helical duct and an inclined duct for each cylinder as hereabove described, the helical duct and the inclined duct emerge from opposite sides of the cylinder head, each duct consisting of an approximately straight feed member and an outwardly curved section leading to the intake valves, and the feed members of the two ducts, as viewed from above, present approximately the same direction. This arrangement is particularly convenient for single-cylinder internal combustion engines.

Alternatively, it is, however, also possible in connection with engines comprising a helical duct and an inclined duct for each cylinder, to arrange the ducts according to another feature of the invention in such a manner that the helical duct and the inclined duct emerge from the same side of the cylinder head, the helical duct extending essentially in tangential relation to the inner wall of the cylinder and the inclined duct substantially in a radial direction in relation to the cylinder axis. This arrangement is particularly advantageous for multi-cylinder internal combustion engines, as it makes it possible for the helical duct of one cylinder and the inclined duct of the adjacent cylinder to be connected to a common inlet conduit or directly to a common receiving chamber for all inlet ports provided at the suction end of the cylinder head. This produces very short inlet ports providing favorable flow conditions and makes it possible to take full advantage of the space available.

Further details of the invention are hereafter described with reference to the accompanying schematic drawings in which

FIG. 14 shows a horizontal cross-sectional view of another type of an internal combustion engine according to the invention, FIG. 15 a cross-sectional view on line XV—XV of FIG. 14, FIG. 16 a horizontal cross-sectional view of another type of engine according to the invention, FIG. 17 a horizontal cross-sectional view of a multicylinder internal combustion engine according to the invention, FIG. 18 a cross-sectional view on line XVIII—XVIII of FIG. 17, FIG. 19 a horizontal cross-sectional view of another type of internal combustion engine according to the invention, FIG. 20 a horizontal cross-sectional view of another embodiment of the invention, FIG. 21 a cross-sectional view on line XXI—XXI of FIG. 20, FIGS. 22 to 25 each show a further horizontal cross-sectional view of various internal combustion engines according to the invention, FIG. 26 a horizontal cross-sectional view of another type of cylinder head of an internal combustion engine according to the invention, and FIG. 27 a horizontal cross-sectional view of a variant of a cylinder head according to the invention.

Figure 1:
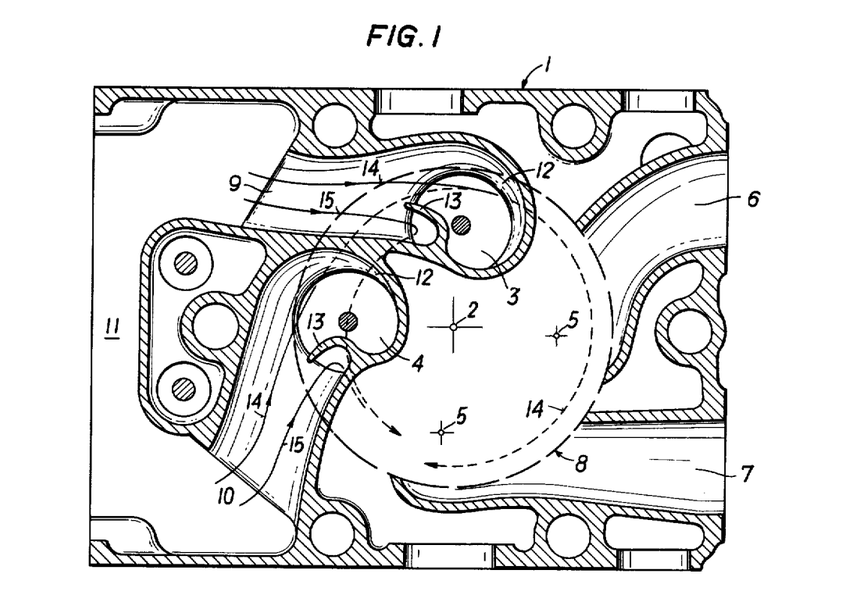
FIG. 1 shows the horizontal cross-sectional view of the cylinder head of an internal combustion engine according to the invention, limited to the areas which are essential for the understanding of the invention.

Of the cylinder head 1 of the four-valve internal combustion engine of FIG. 1 only the two intake valves 3 and 4 offset by about 90° in relation to the cylinder axis 2 are shown in the drawing.

Of the exhaust valves only the axes 5 are shown for greater clarity and the illustration of the exhaust ports 6 and 7 is terminated at the dotted circle 8 defining the cylinder diameter.

In the area above the valves 3 and 4 the inlet ports 9 and 10 emerging from a common receiver chamber 11 provided in the cylinder head 1, each form a helical annular chamber 12. From the inner boundary wall of each of the two inlet ports 9 and 10 a rib 13 protrudes into the annular chamber 12 whose free extremity faces the entrance of each inlet port. By means of the rib 13 the combustion air entering through the inlet ports 9 and 10 is split up into branch currents 14, 15, of which one, designated by reference number 14, enters the annular chamber 12 and there flows directly through the valve clearance into the cylinder. The other branch current 15 is deflected by the rib 13 directly to the valve clearance and enters the cylinder in a direction opposed to the air current 14 in relation to the cylinder axis 2. The air currents 14 and 15 rotating in opposite directions collide inside the cylinder, thus producing a vehement turbulence of the cylinder charge. The stronger air current 14 rotating at a larger distance from the cylinder axis 2 carries the weaker branch air current 15 along so as to produce a resulting rotational flow in the sense of the intended direction of rotation of the cylinder charge, clockwise that is, the rotational flow being superimposed by the vehement turbulence produced by the collision of the branch currents 14 and 15.

Figure 2:
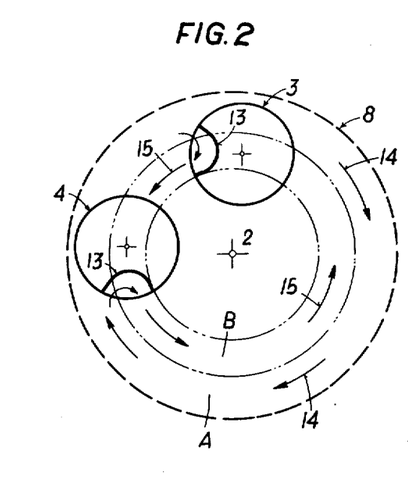
FIG. 2 is a diagrammatic illustration of the flow conditions in the cylinder head shown in FIG. 1.

In FIG. 2 these flow conditions are illustrated in a highly diagrammatic manner. The flow conditions apply to an arrangement of the intake valves 3, 4, wherein the ribs 13 or other inserts responsible for the subdivision of the combustion air are located at the same distance from the cylinder axis 2 and also occupy substantially the same relative position in relation to the axis 2. In that case the branch air currents 14 and 15 flow approximately in concentric annular zones A and B, the air in the outer ring A flowing in the main direction of the rotational flow and in the inner ring B in the opposite direction. Of course, the annular zones A and B are not sharply defined and a minor mixtuure of the two branch currents 14 and 15 occurs already when they enter the cylinder.

Figure 3:
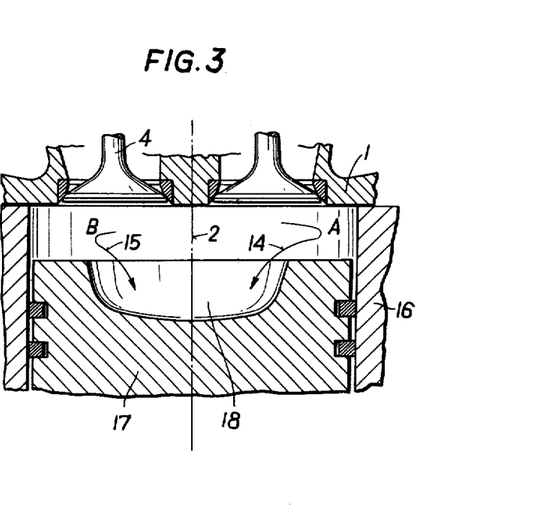
FIG. 3 is a partially axial sectional view of the cylinder of an internal combustion engine shown in FIG. 1.

As appears from FIG. 3, the essential mixture is produced by the collision of the branch currents 14 and 15 in the cylinder 16 only towards the end of the compression stage, when the branch currents rotating in the annular zones A and B are shifted into the combustion chamber 18 located in the piston 17. The branch currents 14 and 15 are therefore, intimately mixed only just prior to the combustion stage, so that the turbulence thereby produced is maintained almost intact until the fuel is injected.

Figure 4:
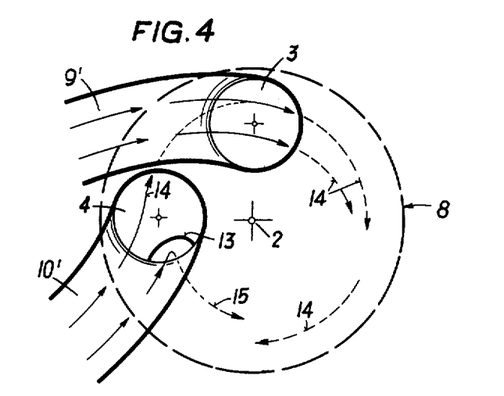
FIG. 4 to 6 illustrates various embodiments of the invention relating to the arrangement of the inlet ports and intake valves of internal combustion engines according to the invention.

As different from the embodiments of the invention hereabove described, action intended to produce turbulence can be taken at one of the two intake valves only. Such a case is illustrated in FIG. 4, where the two inlet ports 9' and 10' leading to the valves 3 and 4 are designed as so-called inclined ducts, a rib 13 subdividing the cross-section of the ducts being provided in the inlet port 10' only. Consequently, a branch air current 14 directed in the sense of the main rotational flow in the cylinder enters the cylinder through the intake valve 4, and a branch current 15 rotating in the opposite direction enters the cylinder through the valve clearance in front of the rib 13. The air current 14 combines with the air currents 14 entering the cylinder in the same sense of rotation through the valve 3. As compared with the type of cylinder head shown in FIG. 1, the turbulence thus produced is less vehement, but on the other side, the rotation of the cylinder-charge is increased.

Figure 5:
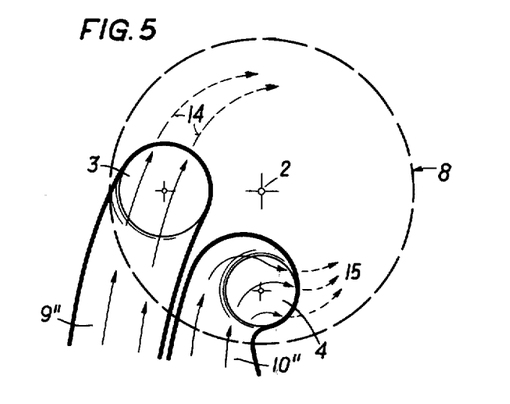

As appears from FIG. 5, the purpose of the invention can also be achieved without any inserts in the inlet ports. For that purpose, the inlet port 9'' leading to the valve 3 is designed as an inclined duct of the conventional type, whereas the inlet port 10'' leading to the valve 4 is designed as a rotational-flow duct comprising a duct section wound about the valve axis spiral-fashion and sloping off towards the valve. While the air entering the cylinder through the inclined port 9'' rotates in the intended direction of the main rotational flow, the combustion air in the rotational flow duct 10'' is partly deflected in the opposite direction of rotation as indicated by arrows 15. In order to reinforce the resulting rotational flow the throughput through one of the two inlet ports can be reduced as compared with the other inlet port.

Figure 6:
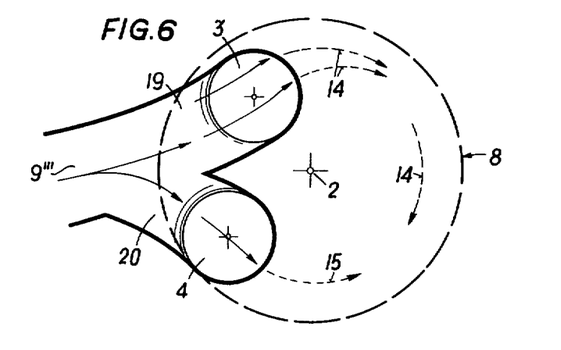

Another variant of an internal combustion engine according to the invention is illustrated in FIG. 6, where the two valves 3, 4 are connected to inclined ducts 19, 20 branching off a common inlet port 9'''. Here again, the collision of the branch air current 14 of greater force, directed through the intake valve 3, with the weaker branch air current 15 entering the cylinder via the intake valve 4 produces a turbulent rotational flow rotating clockwise about the cylinder axis 2.

The embodiment of the invention shown in FIGS. 7 to 10 comprises a cylinder head 21 of a water-cooled four-valve internal combustion engine whose intake valves are designated by reference numbers 22, 22' and the exhaust valves designated by reference numbers 23, 23'. The axes 24, 24' of the intake valves 22, 22' and the axes 25, 25' of the exhaust valves 23, 23' are, as viewed from above the cylinder head, angularly spaced apart 90° about the cylinder axis 26 and located on a circle 27 in concentric relation to the cylinder axis 26.

Figure 7:
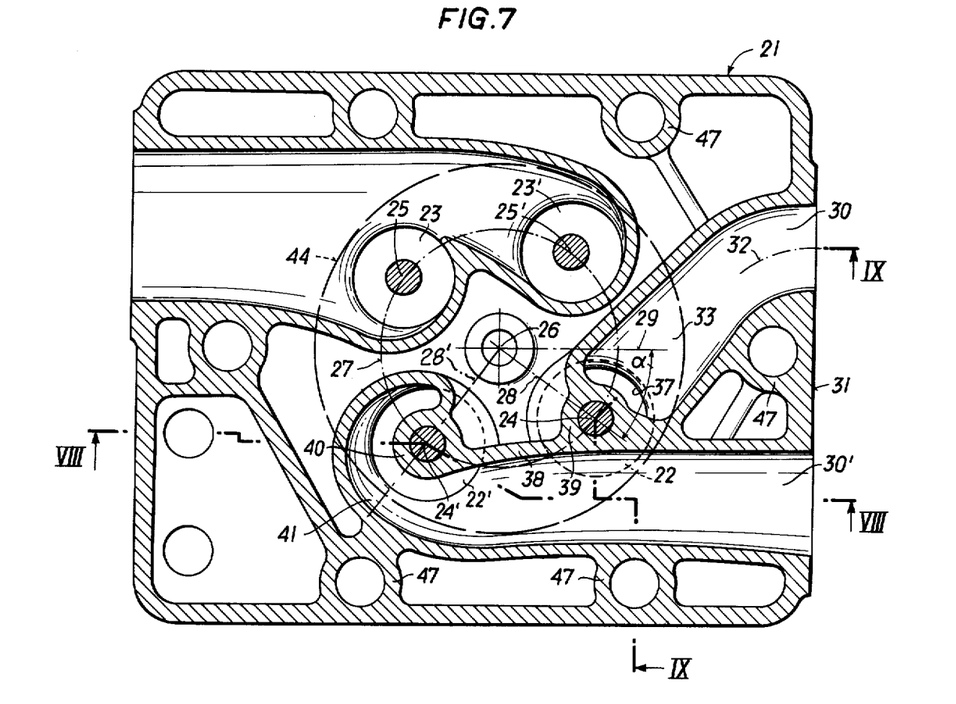
FIG. 7 is a horizontal cross-sectional view of a cylinder head according to the invention, FIG. 8 another cross-sectional view on line VIII—VIII of FIG. 7, FIG. 9 another cross-sectional view on line IX—IX of FIG. 7.
Figure 8:
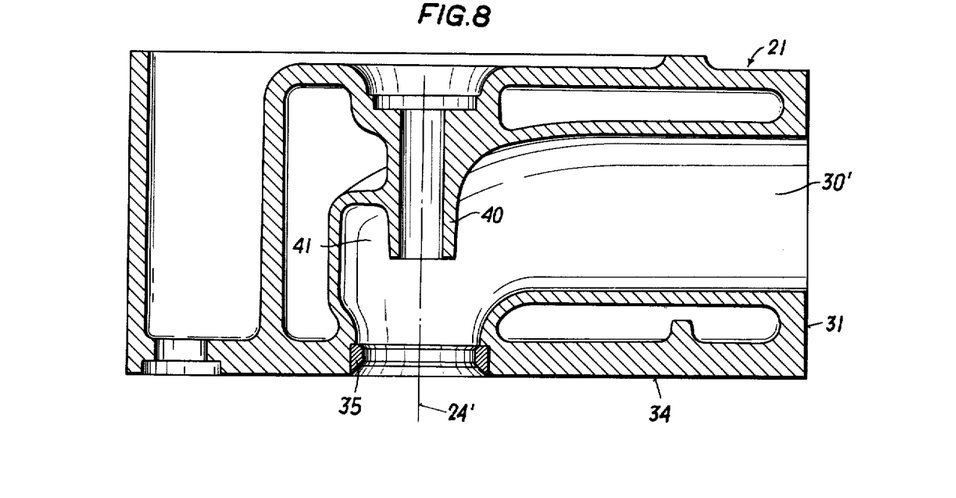

The valves are arranged in such a manner that a plane 28 placed through the valve axis 24 of the intake valve 22 and through the cylinder axis 26 intersects along the cylinder axis 26 with a plane 29 which is normal to the longitudinal axis of the engine, and forms an angle $\alpha$ of maximum 45°, respectively, with said normal plane.

The second intake valve 22' has its axis 24' located in a second plane 28', including the cylinder axis 26 and forming an angle of approximately 90° with the first plane 28.

An inlet port 30 emerging from the suction-end cylinder head side-wall 31 and designed as an inclined duct leads to the intake valve 22. As viewed from above, the axis of the inlet port 30 extends from the cylinder head side-wall 31 first as an arch 32 followed by a straight section 33 which is tangential to the arch 37.

Figure 9:
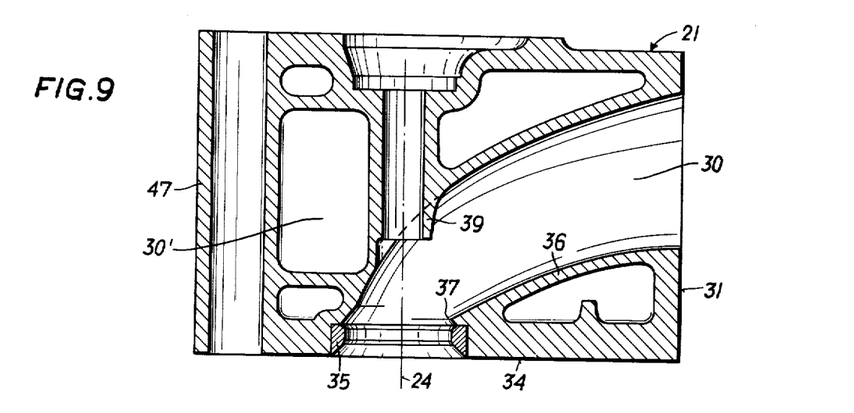

As appears from FIG. 9, the wall 36 of the inlet port 30 located close to the cylinder head bottom 34 slopes relatively slightly towards the valve seat 35 and forms a cutting edge 37 above the valve seat 35.

To the other intake valve 22' leads an inlet port 30' designed as a helical duct and extending substantially in transverse relation to the cylinder head side-wall 31. Its inner wall 38 facing the center of the cylinder forms an arch interconnecting the valve guide bearings 39 and 40 of the intake valves 22, 22', the convex side of the arch facing the cylinder center. The section 41 of the helical duct 30' wound spiral-fashion about the valve guide bearing 40 and sloping down towards the valve seat adjoins this arcuate duct portion. As appears from FIG. 8, the inlet port 30' between the cylinder head side-wall 31 and its spiral-shaped section 41 extends approximately along a straight line and parallel to the bottom 34 of the cylinder head.

Figure 10:
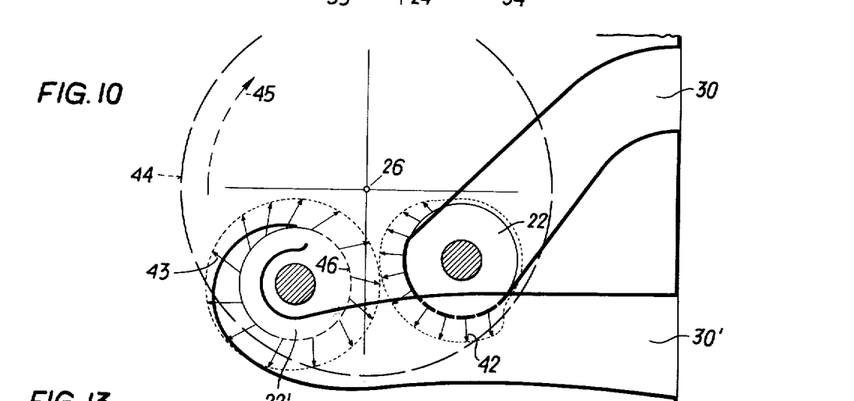
FIG. 10 is a schematic illustration of the flow conditions in the valve area of the cylinder head shown in FIG. 7.

The flow conditions in the area of the intake valves 22, 22' resulting from the arrangement and design of the inlet ports 30, 30' are schematically illustrated in FIG. 10. Reference number 42 designates the velocity vectors of the air entering the cylinder 44 through the inlet port 30 and the open valve 22, and reference number 43 the corresponding velocity components at the other intake valve 22'. Superposition of these two air currents leads to a rotation of the cylinder charge in the main direction of the rotational flow indicated by arrow 45.

In the peripheral area 46 of the intake valve 22' marked by dotted lines the velocity vectors 43 emerge in a direction opposed to the main direction 45 of the rotational flow, so that they impinge upon the considerably stronger air current directed through the intake valve 22 and are directed by said current into the main direction 45 of the rotational flow. The collision between the air currents flowing in opposite directions produces a vehement turbulence which superimposes itself upon the rotational flow of the cylinder charge, expediting the mixture formation and thus contributing decisively to a complete combustion in the cylinder 44.

The port arrangement shown in FIGS. 7 to 10 distinguishes itself by comparatively short ducts offering favorable flow conditions. Moreover, it offers the advantage that suufficient space is available between the two inlet ports 30, 30' for the accommodation of a bolt bearing 47 for one of the cylinder head fixing screws (not shown) for example.

Figure 11:
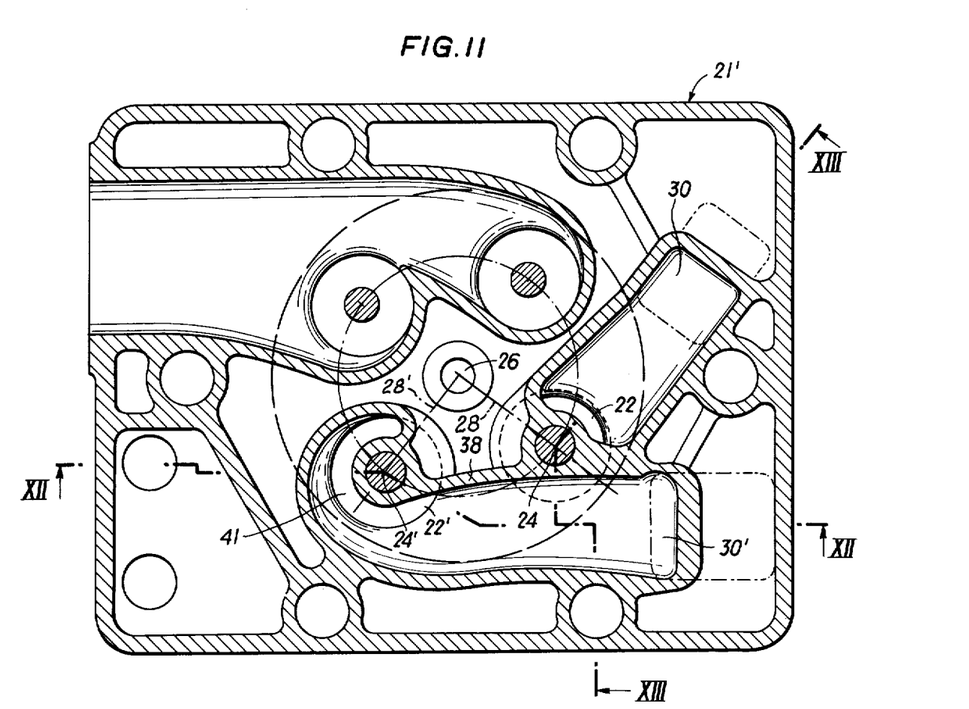
FIG. 11 is a horizontal cross-sectional view of another type of cylinder head according to the invention.
Figure 12:
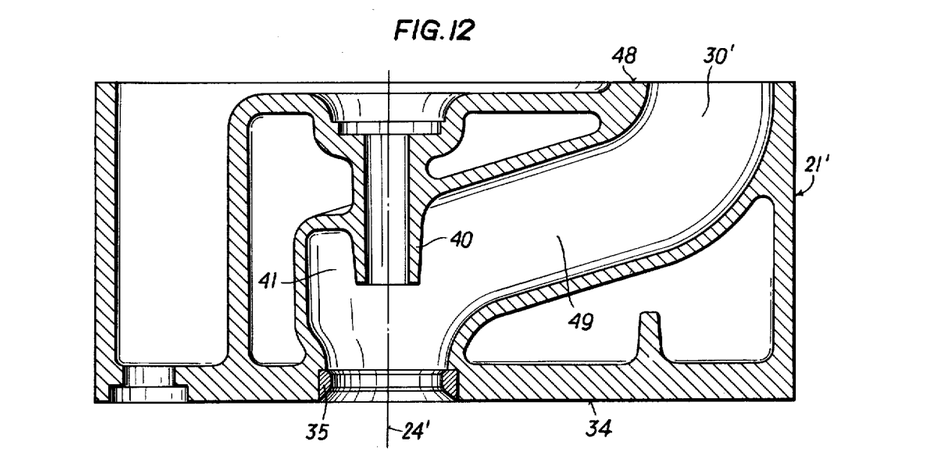
FIG. 12 is a cross-sectional view on line XII—XII of FIG. 11.
Figure 13:
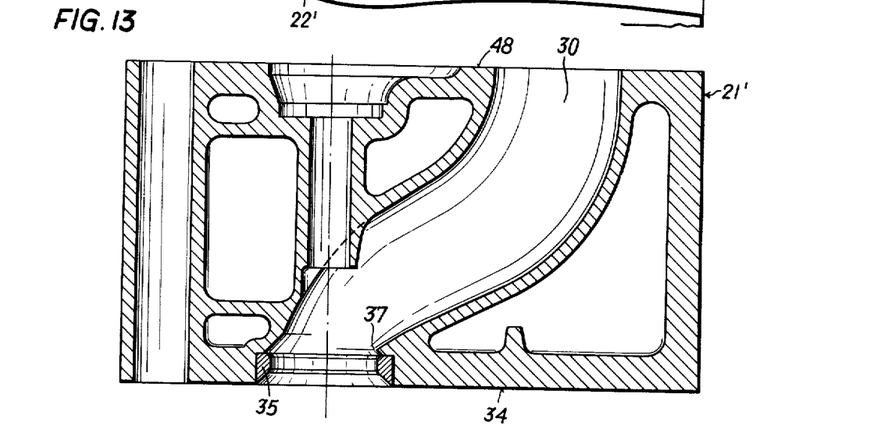
FIG. 13 is another cross-sectional view on line XIII—XIII of FIG. 11.

The type of cylinder head shown in FIGS. 11 to 13 differs from the embodiment of the invention hereabove described essentially in that the two inlet ports 30, 30' emerge from the upper boundary wall 48 of the cylinder head 21', the inlet ports being arranged in such a manner that as viewed from above the cylinder head, they extend approximately along a straight line. As appears from FIG. 13, the inlet port 30 designed as an inclined duct slopes down towards the valve seat 35 with an arch which is convex in the direction of the cylinder head bottom 34, forming also a cutting edge 37.

The axes of the two inlet valves are located in planes 28 and 28' respectively (FIG. 11) common to the cylinder axis 26 and at approximately 90° to each other as heretofore described with reference to FIG. 7.

The inlet port 30' designed as a helical duct first extends along an arch which is convex towards the cylinder head bottom 34, followed by a section 49 slightly curved in the opposite direction and continuing as a spiral shaped duct portion 41. The flow conditions obtained for the cylinder head shown in FIGS. 11 to 13 are substantially the same as those indicated schematically in FIG. 10 for the former embodiment of the invention.

In the four-valve internal combustion engines with internal mixture formation shown in FIGS. 14 to 25, both the two intake valves 51 and the two exhaust valves 52 are arranged in pairs side by side. The axes 53 of the intake valves 51 and the axes 54 of the exhaust valves 52 are located symmetrically in relation to a normal plane 56 of the engine including the cylinder axis 55. The inner contour of each cylinder is indicated by a dot-and-dash line 57.

Figures 14, 16:
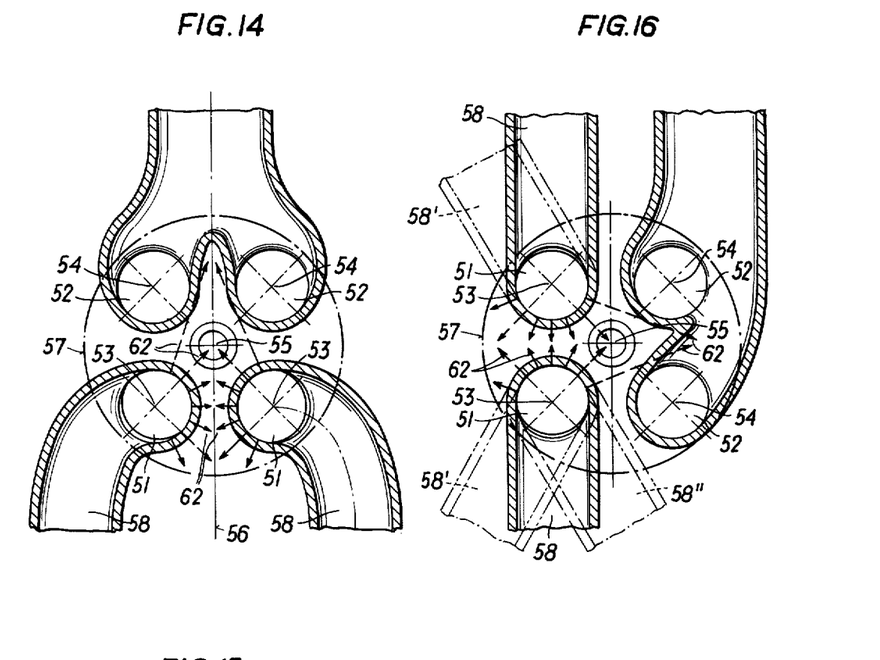
Figure 15:
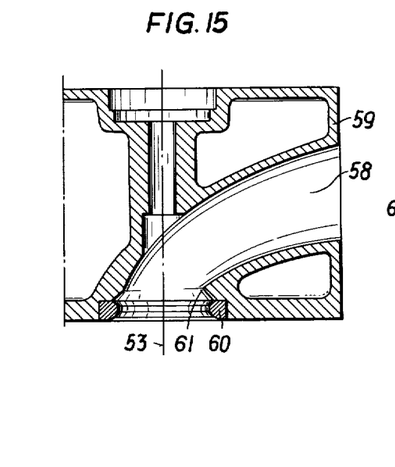

The two inlet ports 58 of the cylinder head shown in FIGS. 14 and 15 are designed as inclined ducts emerging from the same side-wall of the cylinder head 59 and arcuate in the direction of the normal plane 56.

As appears from FIG. 15, the inlet ports 58 slope comparatively slightly down towards the valve seat ring 60. At the lower duct wall a cutting edge 61 is provided just above the valve seat ring 60.

The arrows 62 in FIG. 14 illustrate the flow components of the combustion air entering the cylinder through the two intake valves 51, said components being symmetrical in relation to the normal plane 56.

The opposing flow components 62 collide, producing a vehement turbulence of the cylinder charge, thereby considerably improving the mixture formation and increasing the speed of combustion. As a result of the symmetrical flow conditions the formation of a resulting rotational flow of the combustion air about the cylinder axis 55 is suppressed.

The design of the cylinder head shown in FIG. 16 differs from the embodiment of the invention hereabove described substantially in that the two inlet ports 58 extend along a straight line and in opposite directions. The resulting flow conditions coincide largely with those of the foregoing embodiment of the invention. Flow conditions differ if the inlet ducts, as indicated by dotted lines in FIG. 16 are arranged in inclined relation to each other. Thus the center of turbulence is shifted towards the middle of the cylinder without the formation of a resulting rotational flow of the cylinder charge, if the inlet ports 58' are inclined, but arranged symmetrically. On the other hand, if one of the inlet ports is designed according to the illustration 58'' and the opposite inlet port aaccording to 58', the lateral displacement of the parallel inlet ports 58' and 58'' produces in addition to the intended turbulence also a slight resulting rotation of the cylinder charge.

Figure 17:
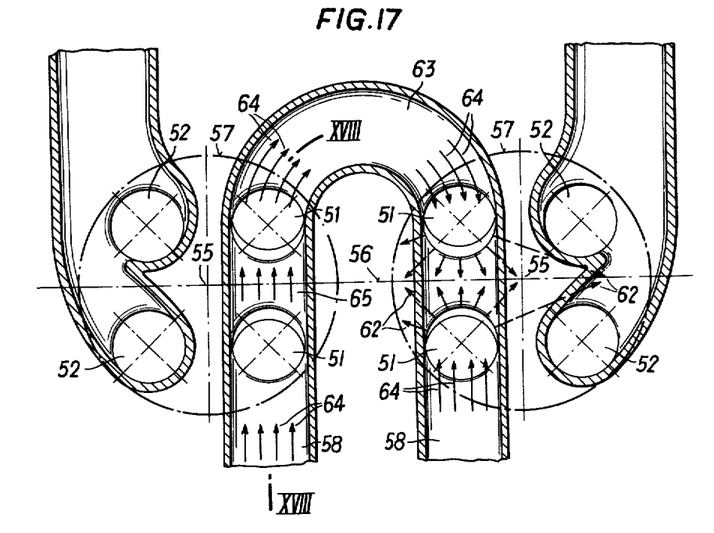
Figure 18:
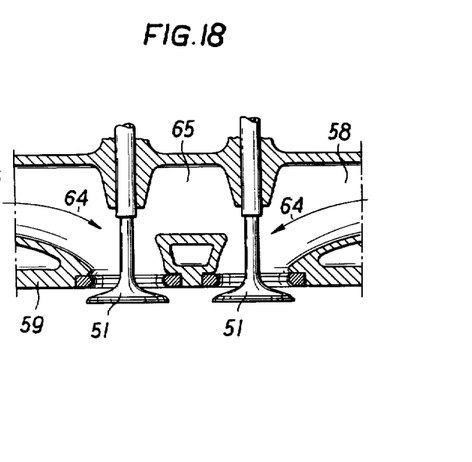

FIGS. 17 and 18 show the application of the subject matter of the invention to a multi-cylinder internal combustion engine, where the valves are arranged in such a manner that the intake valves 51 of adjacent cylinders are directly opposite each other. Both the intake valves 51 and the exhaust valves 52 are symmetrically arranged in relation to the normal plane 56 which represents simultaneously the longitudinal median plane of the engine. In each case two parallel inlet ports 58 extending in transverse relation to the normal plane 56 are provided and interconnected by means of a semicircular bend 63. The arrows 64 indicate the flow of the combustion air during the induction stroke of the cylinder shown in the right half of FIG. 17. At this moment the intake valves 51 of the cylinder shown in the left half of this figure are closed. While the combustion air flows through the inlet port 58 shown in the right half of the FIGURE directly to the nearby intake valve 51, through the inlet port 58 shown in the left half of the FIGURE, the connecting duct 65 provided between the intake valves and the bend 63, combustion air passes to the intake valve 51 located in the right half of the FIGURE above the normal plane 56. The flow conditions thereby produced in the right cylinder are similar to the ones described in connection with FIG. 14, providing vehement turbulence without any resulting torsional flow.

After the intake valves of the right cylinder have been closed and the intake valves of the left cylinder opened, the direction of flow of the combustion air in the bend 63 is reversed and the inlet process for the left cylinder is the same as described for the right cylinder.

Figure 19:
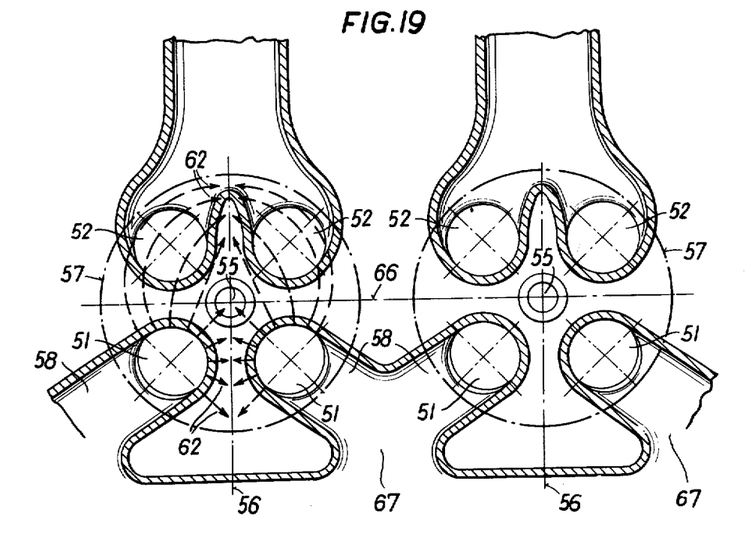

FIG. 19 also shows the application of the principle of the present invention to a mutli-cylinder internal combustion engine wherein all intake valves 51 are located in line on the same side of the cylinder head. Again, both the intake valves 51 and the exhaust valves 52 of each cylinder are arranged symmetrically in relation to normal planes 56 located in perpendicular relation to the longitudinal median plane 66 of the engine.

The particularity of this design resides in the fact that the two inlet ports 58 of each cylinder extend approximately in a radial direction in relation to the cylinder axis 55, the adjacent inlet ports 58 of adjacent cylinders being each connected to a common feed duct 67.

In view of the approximately radial pattern of the inlet ports 58 designed as inclined ducts, the flow conditions produced in the cylinder differ from the ones obtained according to the embodiments of the invention described with reference to FIGS. 14 to 18 insofar as the flow components 62 are substantially evenly distributed over the cylinder cross-section, so that collisions of branch currents accompanied by the production of turbulence occur practically all over the area of the cylinder cross-section located in the normal plane 56.

Figure 20:
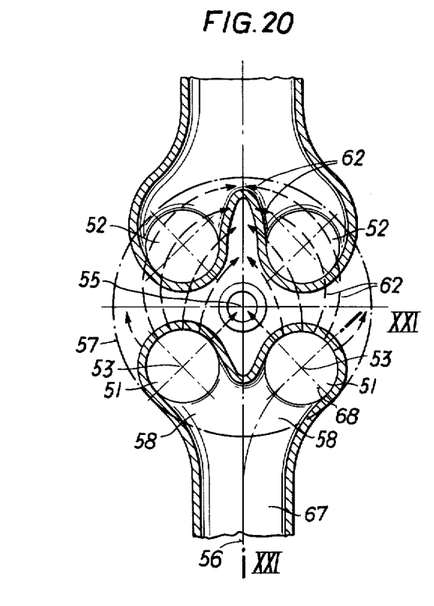
Figure 21:
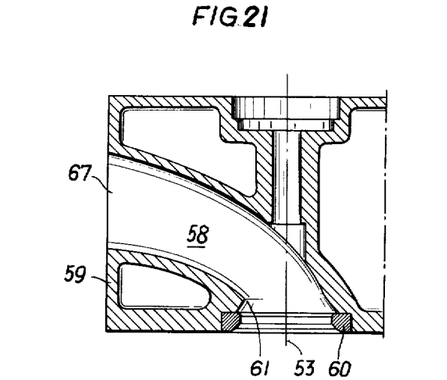

In the cylinder head shown in FIGS. 20 and 21 a common feed duct 67 is provided for the two intake valves 51, from which the inlet ports 58 also designned as inclined ducts branch off in diverging directions. In the area close to the valve the two inlet ports 58 take a direction forming a right angle with a connecting line 68 extending through the valve axis 53 and the cylinder axis 55 as viewed from above. The arrows 62 indicate the flow conditions resulting from the diverging arrangement of the two inlet ports 58. It will be seen that this diverging arrangement leads to a displacement of the flow components and consequently, of the zone of vehement turbulence into the half of the cylinder opposite the intake valves 51.

The design of the cylinder head shown in FIGS. 20 and 21 distinguishes itself also by particularly low space requirements for the accommodation of the inlet port system.

As different from the embodiments of the invention herebefore described, helical ducts 69 are used as inlet ports for the types of cylinder heads illustrated in FIGS. 22 to 25. Helical ducts are particularly suitable for the production of increased turbulence because the combustion air emerges through the valve clearance in a far larger peripheral area as is the case with inclined ducts.

Figure 22:
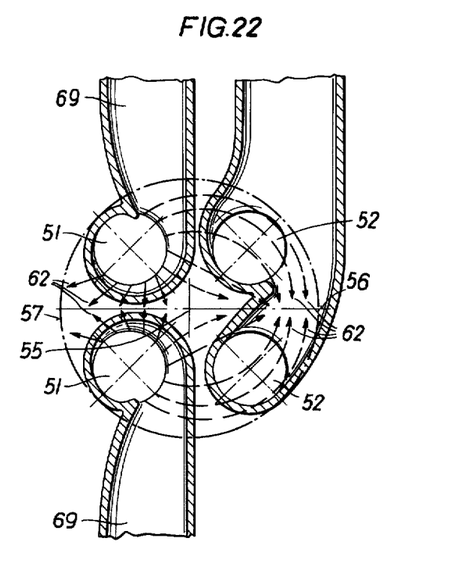

In the cylinder head according to FIG. 22 the two helical ducts 69 extend substantially in opposite directions. Here again, collision of the flow components 62 occurs essentially in the area of the normal plane 56 with an approximately uniform distribution over the cross-sectional area of the cylinder. In a similar manner as with the inclined duct arrangement shown in FIG. 19 both clockwise rotating and anticlockwise rotating flow components 62 are produced at each of the two intake valves.

Figure 23:
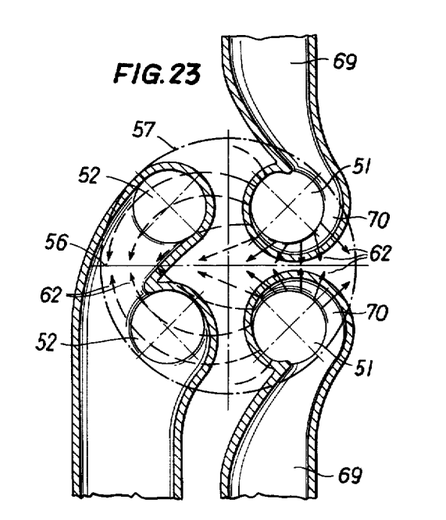

The design illustrated in FIG. 23 differs from the embodiment of the invention shown in FIG. 22 essentially in that the direction of winding of the section 70 of the two helical ducts 69 sloping down spiral-fashion towards the valve seat is reversed. The flow conditions in the cylinder are about the same as in the cylinder head shown in FIG. 22, the only difference being that a somewhat smaller angle between the flow components 62 emerging in the proximity of the wall and the inner wall 57 of the cylinder is obtained.

Figure 24:
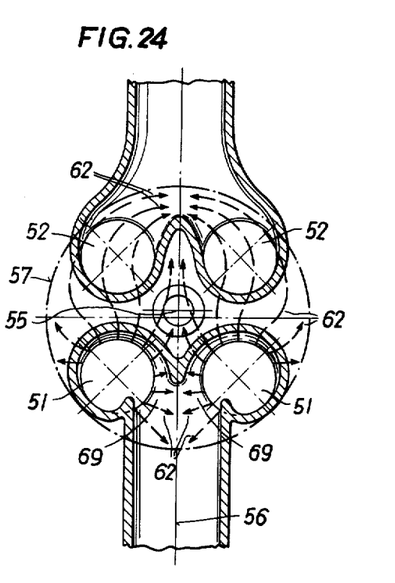

FIG. 24 shows the connection of two helical ducts 69 arranged symmetrically in relation to the normal plane 56 to a common, radially extending feed duct 67. Here too, the formation centers of increased turbulence are rather uniformly distributed over the entire cross-section of the cylinder.

Figure 25:
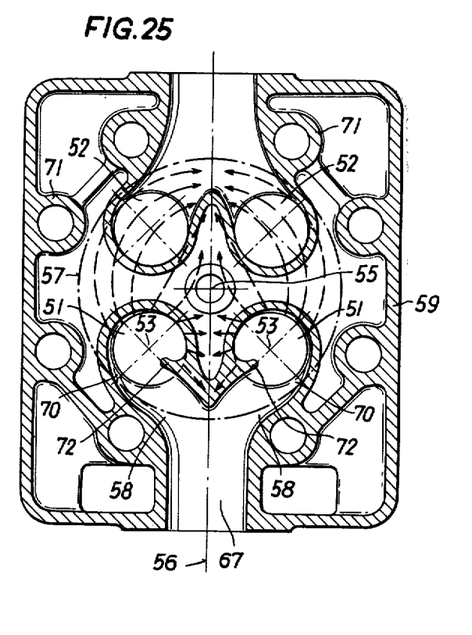

In the cylinder head designed as shown in FIG. 25 the direction of winding of the helical duct sections 70 is opposed to the one in the embodiment hereabove described. As appears clearly from the drawing, this design of both the inlet and the exhaust port system takes full advantage of the space available so that the whole of the eight screw bearings 71 for the cylinder head fixing screws (not shown), but also relatively large cooling-water chambers can be conveniently accommodated.

The particularity of the inlet port arrangement shown in FIG. 25 resides in the fact that the spiral-shaped duct section 70 of each intake valve 51 is subdivided by means of a tongue 72 directed towards the valve axis 53. This tongue can extend as far as the valve seat and serves to split the combustion air entering through the inlet port 58 into at least two definite branch currents, thereby also contributing towards increased turbulence in the cylinder.

Figure 26:
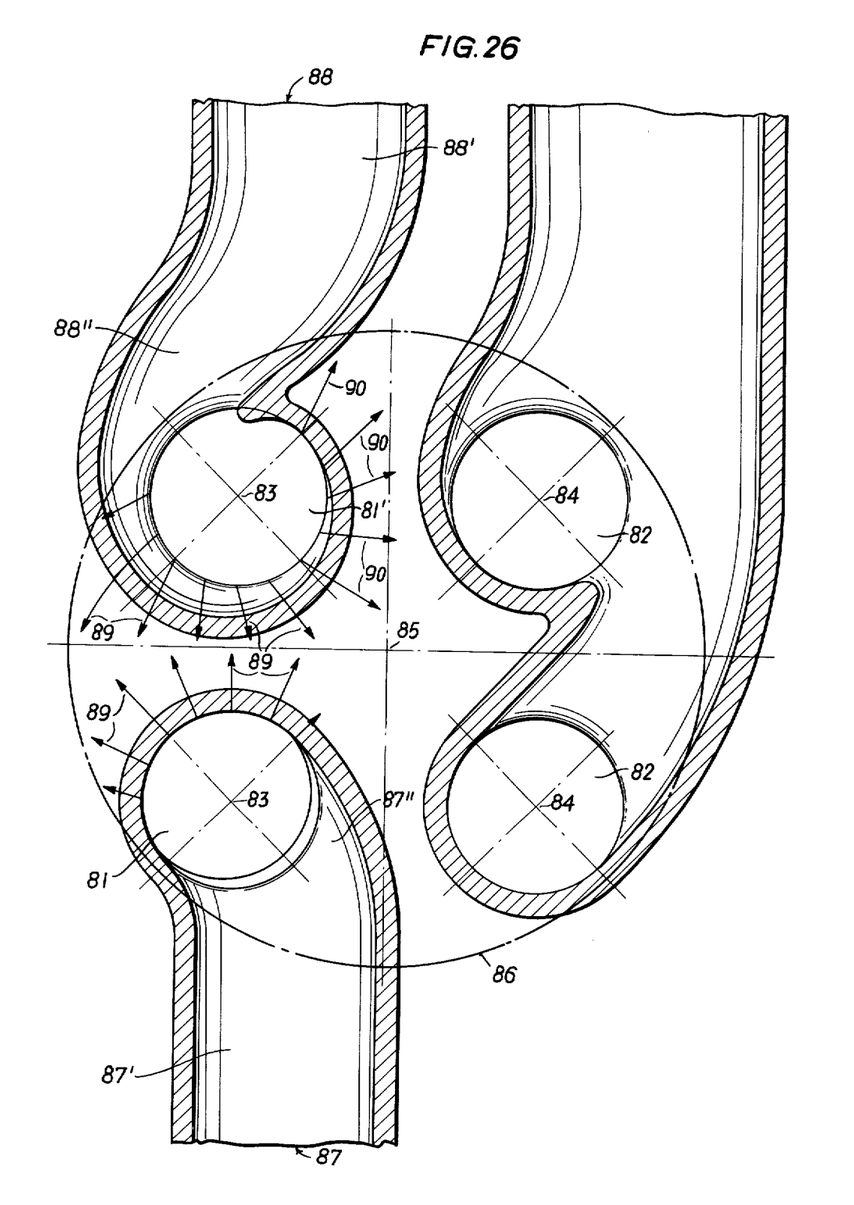
Figure 27:
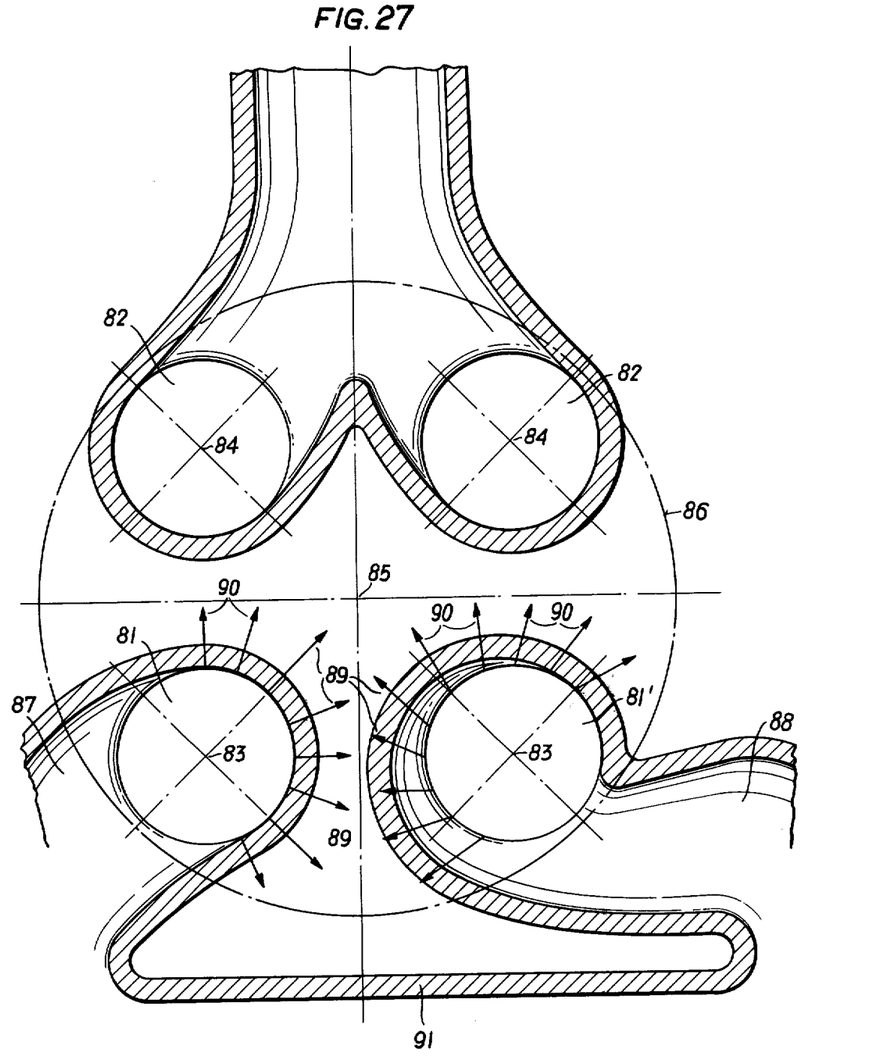

The embodiments illustrated in FIGS. 26 and 27 show the cylinder head of a four-valve internal combustion engine with internal mixture formation, comprising two intake valves 81, 81' arranged in pairs side by side, and two exhaust valves 82 arranged in pairs opposite the former. The axes of the intake valves 81, 81' are designated by reference number 83 and the axes of the exhaust valves 82 by reference number 84, while 85 designates the cylinder axis. The inner wall of the cylinder is indicated by the dotted circle 86. Both designs have the arrangement of an inclined duct 87 leading to the intake valve 81 and of a helical duct 88 leading to the intake valve 81' in common.

In the cylinder head shown in FIG. 26 the inclined duct 87 and the helical duct 88 emerge from opposite sides of the cylinder head. Each of the two inlet ports 87, 88 comprises an essentially straight feed portion 87', 88' and an adjoining outwardly arcuate section 87'', 88'' leading directly to the associated intake valves 87''', and 88''', respectively. As viewed from above, the feed portions 87', 88' of the two inlet ports 87, 88 are essentially in alignment with each other.

The arrows 89 and 90 indicate the flow components of the combustion air admitted through the two inlet ports 87, 88 as they emerge through the valve clearance into the cylinder. As appears from the drawing, the combustion air emerges at the intake valve 81 connected to the inclined duct 87 through a much smaller peripheral area than at the intake valve 81' connected to the helical duct 88.

In the cylinder area situated between the two intake valves 81, 81', vehement turbulence is produced by the direct collision of the opposing flow components 89. There are, however, also flow components 90 at the valve clearance of the intake valve 81' producing a clockwise rotation of air in relation to the cylinder axis 85, said air rotation superimposing itself upon the turbulence produced by the flow components 89. The flow condition of the cylinder charge thus produced ensures both an intensive mixture formation and speedy combustion.

In the cylinder head shown in FIG. 27 the two inlet ports 87, 88 emerge from the side cylinder head sidewall 91, the inclined duct 87, as viewed from above, extending essentially in a radial direction in relation to the cylinder axis 85, whereas the direction of the helical duct 88 extends approximately in tangential relation to the inner wall 86 of the cylinder.

With this design too, vehement turbulence is generated chiefly in the cylinder area between the two valves 81, 81' due to the collision of the flow components 89 opposed to each other. However, the flow conditions differ slightly from those illustrated in FIG. 26 insofar as flow components 90 exist at the two intake valves 81, 81', whose sense of rotation in relation to the cylinder axis 85 is, however, reversed at the two intake valves 81 and 81'. As a result, partial collision between the opposing flow components 90 occurs in the cylinder area opposite the two intake valves, the flow components 90 of the intake valve 81' predominating, so that a resulting rotation of the cylinder charge in an anticlockwise direction is produced.

It is also possible within the scope of the present invention, to provide each cylinder with two helical ducts as different from the embodiments of the invention hereabove described and as illustrated in the drawings, the resulting rotational flow of the cylinder charge being produced by the asymmetric arrangement and design of the helical ducts.

We claim:

1. In a four-valve internal combustion engine with internal mixture formation, particularly a diesel engine comprising a cylinder head with a cylinder head bottom, a suction end wall and an exhaust end wall and two inlet ducts for the air for combustion, both said ducts extending through said suction end wall, a first intake valve arranged in the cylinder head and having an axis located in a first plane including the cylinder axis, a second intake valve arranged in the cylinder head and having an axis located in a second plane including the cylinder axis and forming an angle of approximately 90° with the first mentioned plane, the first said inlet duct designed as an inclined duct extending through said suction end wall to the first said intake valve, the second said inlet duct being designed as a spiral duct extending through said suction end wall to the second intake valve, the combination of features in accordance with which: the first intake valve is in advance of the second intake valve when viewed in the main direction of rotational flow in a horizontal cross-sectional view of the cylinder head; the first said plane including the cylinder axis and the first intake valve forming an acute angle in the direction of main rotational flow of a maximum of 45° with a reference plane including the cylinder axis and arranged in vertical relation to the said suction end wall of the cylinder head; the two inlet ducts extending substantially in tangential relation to a cylindrical surface located in concentric relation to the cylinder axis and including the axes of the two intake valves.

2. An internal combustion engine according to claim 1, wherein the cylinder head includes a sidewall, said cylinder head sidewall comprising said suction end wall, the two inlet ducts extending from the suction-end cylinder head sidewall, and said inclined duct, as viewed in the plan form of the cylinder head, has a curved section emerging from the suction-end cylinder head sidewall, and an adjoining section extending in tangential relation to the cylinder surface including the intake valve axes, and the spiral duct extends from the suction-end cylinder head sidewall in an approximately vertical relation to the latter, and wherein each of the two intake valves is guided in a valve guide bearing and said spiral duct has a wall on the side facing the cylinder axis, said wall as viewed in the plan form of the cylinder head, extending as an arc interconnecting the valve guide bearings of the two intake valves, the convex side of which faces the cylinder axis and is joined by a section of the spiral duct wound spirally about the valve guide bearing of the second intake valve, and wherein a wall of the inclined duct located closer to the cylinder head bottom and falling off at a small angle towards the first intake valve terminates as an interruption edge in the proximity of the valve.

3. An internal combustion engine according to claim 1, wherein the cylinder head includes an upper boundary wall, said upper boundary wall comprising said suction end wall, the two inlet ducts extending from said upper boundary wall of the cylinder head and, as viewed in the plan form of the cylinder head, extend essentially along a straight line, said inclined duct extending along an arc whose convex side faces the cylinder head bottom, the inclined duct terminating in the vicinity of the valve as an interruption edge, and wherein said spiral duct extends from said upper boundary wall with an arched section which is convex in the direction of the cylinder head bottom and followed by an adjoining inversely arched section which continues as a spiral duct section.

* * * * *